(12) United States Patent
Krco et al.

(10) Patent No.: US 8,838,099 B2
(45) Date of Patent: Sep. 16, 2014

(54) SYSTEM AND METHOD FOR USING SUBSCRIBER ROLE INFORMATION IN A MOBILE COMMUNICATION SYSTEM

(75) Inventors: Srdjan Krco, Dublin (IE); David Loftus, Lucan (IE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 12/921,416

(22) PCT Filed: Mar. 11, 2008

(86) PCT No.: PCT/EP2008/052868
§ 371 (c)(1),
(2), (4) Date: Sep. 8, 2010

(87) PCT Pub. No.: WO2009/112068
PCT Pub. Date: Sep. 17, 2009

(65) Prior Publication Data
US 2011/0014923 A1    Jan. 20, 2011

(51) Int. Cl.
*H04W 4/00* (2009.01)
*H04W 8/06* (2009.01)

(52) U.S. Cl.
CPC .................................. *H04W 8/06* (2013.01)
USPC .................... 455/435.1; 455/458; 455/414.1

(58) Field of Classification Search
CPC .................................. H04W 8/04; H04W 8/02
USPC .................... 455/435.1, 414.1, 414.3, 458
See application file for complete search history.

(56) References Cited

U.S. PATENT DOCUMENTS

| | | | |
|---|---|---|---|
| 6,021,327 A | 2/2000 | Nguyen et al. | |
| 6,039,624 A * | 3/2000 | Holmes | 455/403 |
| 6,078,811 A * | 6/2000 | Lin et al. | 455/433 |
| 6,449,479 B1 * | 9/2002 | Sanchez | 455/433 |
| 6,850,760 B2 * | 2/2005 | De Nicolas | 455/433 |
| 6,975,855 B1 * | 12/2005 | Wallenius | 455/417 |
| 7,475,140 B2 * | 1/2009 | Requena | 709/225 |

(Continued)

FOREIGN PATENT DOCUMENTS

CN    2007/009297 A1    1/2007
CN    101133577 B    2/2008

(Continued)

OTHER PUBLICATIONS

PCT International Search Report, mailed May 6, 2009, in connection with International Application No. PCT/EP2008/052868.

Chinese Search Report, dated Jan. 24, 2013, in connection with counterpart Chinese Application No. 200880129225.X, all pages. (see Translation below).

Translation of Chinese Search Report, dated Jan. 24, 2013, in connection with counterpart Chinese Application No. 200880129225.X, all pages.

*Primary Examiner* — Jinsong Hu
*Assistant Examiner* — Qun Shen
(74) *Attorney, Agent, or Firm* — Leffler Intellectual Property Law, PLLC

(57) ABSTRACT

Data stored about user equipment, such as mobile phones, that is stored in a Home Location Register of a cellular voice network communications system, is augmented with supplemental information and is communicated to an active user in the network upon request emanating from a Visitor Location Register with which the requesting user is associated. Supplemental characteristic information includes, for example, the function, position, rank, responsibility level, etc., that each user has, and what group the user is affiliated with. The user may also use shortcodes to choose which other user to call based on that user's supplemental characteristic information.

4 Claims, 7 Drawing Sheets

(56) References Cited

U.S. PATENT DOCUMENTS

| | | |
|---|---|---|
| 2005/0245232 A1 | 11/2005 | Jakober et al. |
| 2005/0255857 A1 | 11/2005 | Kim et al. |
| 2006/0009214 A1 | 1/2006 | Cardina et al. |
| 2006/0049982 A1 | 3/2006 | Wells |
| 2006/0135127 A1* | 6/2006 | Aarnio et al. ............ 455/412.1 |
| 2006/0141981 A1 | 6/2006 | Lin |
| 2006/0293022 A1 | 12/2006 | Jindal et al. |
| 2007/0147391 A1* | 6/2007 | Wilhoite et al. ......... 370/395.52 |
| 2008/0160995 A1* | 7/2008 | Thiebaut et al. ............. 455/433 |

FOREIGN PATENT DOCUMENTS

| | | |
|---|---|---|
| EP | 0 851 696 A | 7/1998 |
| EP | 1 860 893 A | 11/2007 |
| WO | 2004/051976 A2 | 6/2004 |

* cited by examiner

SYSTEM AND METHOD FOR USING SUBSCRIBER ROLE INFORMATION IN A MOBILE COMMUNICATION SYSTEM

TECHNICAL FIELD

This invention involves mobile communications systems and in particular a system and method relating to processing of information regarding users.

BACKGROUND

The complicated and coordinated systems that make mobile communication possible, for example, using the ubiquitous mobile telephones, are so generally reliable that most users in highly industrialized countries take their availability for granted. Indeed, most users are made aware of the sophisticated infrastructure behind such systems only on infrequent occasions, for example, when their mobile phone connection is lost in an area of poor coverage, or in boundary zones between cells, or they cannot connect at all because of an unusually high temporary load on the system.

Of course, reality sometimes drastically disrupts such complacency. Disasters, both natural and human-caused, often disable the communications networks many rely on. For example, mobile and fixed telephone systems are often either overloaded or disabled altogether in areas hit by earthquakes, floods, terrorist attacks, etc. Furthermore, other users, such as military personnel in the field, may not have access to the local communications network at all, or may not want to have to rely on vulnerable links to satellite ground stations.

As distressing as system disruption may often be for civilians in affected areas, it often also hinders the ability of emergency personnel to operate most effectively, which may make matters even worse. Aware of this, several companies and authorities have developed both equipment and standards for secondary, often mobile networks that are substantially self-reliant and can be deployed rapidly and are particularly suited for enabling communication between members of a group who need to coordinate work on a common task.

In disaster or other emergency situations, there will usually be some need to prioritize access to the limited resource that such mobile systems represent. One example of prioritization might be, in descending order of priority: executive leadership and policy makers; disaster response and military command and control; public health, safety and law enforcement command; public services, utilities and public welfare; and disaster recovery.

Of course, the prioritization scheme—if any is implemented at all—will depend on the situation. Regardless of the scheme, however, in any highly stressful situation, not knowing whom one can or cannot call can have serious or at best undesirable consequences. An additional complication is that, in circumstances such as disasters, in battle zones, etc., the various members of the group who need to communicate with each will often not be known to each other in advance, but to establish communications between two members of the group using mobile telephones, at least the telephone numbers must be known.

Moreover, the roles that persons are carrying out, or their positions in some hierarchy of authority or prioritization, may be as important or even more important than who they are. For example, knowing that a particular mobile phone is associated with a paramedic as opposed to with a fire fighter, police officer, search specialist, etc., or with a division commander as opposed to a line officer, will often be more important than knowing their names.

One way to provide the necessary information to the various members of the group would be to have some external information service that could provide contact information to interested parties. Even if it were possible to set up such a service in the event of disruption of established primary networks, however, relaying the retrieved contact information would still cause a delay that might be unacceptable for emergency efforts on the ground. Moreover, in the field of mobile telephony operating according to, for example, the Global System for Mobile (GSM) and Universal Mobile Telecommunications System (UMTS) standards, typically only the priority class of the mobile phone itself is stored in the network in conjunction with its International Mobile Subscriber Identity (IMSI), which is a unique number associated with the network mobile phone users—the IMSI is stored in the Subscriber Identity Module (SIM) in the phone and is transmitted by the phone to the network. This will normally not be enough information for, for example, relevant emergency personnel.

In any emergency situation the ability to know which mobile belongs to which person, and in particular the role (paramedic, fireman, policeman, search specialist, etc.) they are carrying out at a disaster site will help facilitate communications on the ground, thereby adding to the overall effectiveness of the aid effort. Also, knowing which of these personnel is nearest to your present location is also vital in situations where time is a critical factor.

International Application No. PCT/IB2003/005250, published 17 Jun. 2004 as Publication No. WO/2004/051976, "Automatic Notification of Personal Emergency Contacts From a Wireless Communications Device," Inventors: Brian Esque, et. al., assigned to Sony Ericsson Mobile Communications AB discloses a system that sends emergency notification messages to a designated personal emergency list in an emergency scenario. The information and relevant access capability is stored in the wireless communication device. Although this may be relevant to the person that owns a mobile device, it is not relevant to the activities undertaken by emergency personnel.

United States Published Patent Application No. 2005/0245232 A1, entitled "Emergency response mission support platform," inventors Robert Jakober, et al., published 3 Nov. 2005, relates to a system that deals with the amalgamation of emergency data for use by situation managers. A process is proposed that involves a knowledge-sharing environment that can facilitate easier and more efficient sharing of information between emergency organizations. The proposal does not deal with establishment of connections/calls between individuals and as such does not provide any mechanism for. Moreover, it is assumed that all emergency personnel will use some sort of user name and password to log into the system to gain access to available information. There is no provision for automatic distribution of roles each person has in the ongoing emergency activities or solutions for mobile network support in such scenarios.

U.S. Pat. No. 6,021,327, "Mobile communication system having improved visitor location register" (inventors: Nhut Nguyen, et al., issued 1 Feb. 2000, assignee: Nortel Networks Corporation) discloses a wireless communication system configured as a GSM system, with, among other known components, a mobile switching center (MSC), a visitor location register (VLR) and a visitor location register manager (VLRM). The VLR corresponds to one of the MSCs and stores subscriber information for mobile terminals that are active in corresponding cells. The VLRM downloads, from a home location register (HLR), subscriber information for mobile terminals becoming active within one of a plurality of cells corresponding to the VLR and stores the subscriber information as a VLR record in the VLR. In accordance with the present invention, the VLRM selectively retains VLR records when corresponding mobile terminals becomes inactive within the cells corresponding to the VLR. The VLRM organizes the VLR records based upon a selected priority. Stored on the basis of priority, the VLRM may delete VLR records on the same priority basis. In this '327 patent, priority is preferably based on the "age" of presence in the VLR, that is, it is a function of a time stamp of last activity within any cell respective to the VLR.

SUMMARY

A wireless, cellular voice network includes at least one communications system and a plurality of user equipment (UE) devices, each connected to a respective current one of communications systems. Each communications system provides communication between the UE devices, and has at least a pair of registers: a primary register in which is stored information about each UE device that is primarily associated with that respective communications system; and a second register in which is stored information about each UE device that is not primarily associated with that respective communications system, but that is currently active within a service area of that communications system.

Each primary and second register stores at least one entry indicating supplemental characteristic information of each of a plurality of subscribers actively connected to one of the communications systems.

An auxiliary role distribution component receives from the second register the supplemental characteristic information of each of the subscribers actively connected to any one of the communications systems and transmits the supplemental characteristic information to a requesting UE device upon request from the second register with which a requesting UE device is currently associated.

In one embodiment, the communication systems are configured according to any Global System for Mobile (GSM) standard (including, but not limited to 3G, 4G, etc.), other GSM-based technologies such as the "Long Term Evolution" (LTE) technology, the General Packet Radio Services (GPRS), or the Universal Mobile Telecommunications System (UMTS) standard; the primary register is a Home Location Register (HLR); the second register is a Visitor Location Register (VLR); and the UE devices are mobile telephones. The communications system may be a transportable, distributed, cellular, wireless, WCDMA (Wideband Code Division Multiple Access), self-contained, autonomous voice network systems. In this case, by initiating distribution of the supplemental characteristic information from the VLR of a newly entering subscriber to that newly entered UE instead of having to broadcast to all UEs information about all UEs every time a new subscriber enters, less data will generally need to be transferred over the network to UEs when a new UE enters the network.

The supplemental characteristic information may indicate a role performed by a user of each UE device, for example, in the context of workers in a disaster who will have different types of jobs to do.

An entry such as a simple bit flag may be included in the corresponding primary register of each participating UE device to designate whether that UE device is a participating UE devices. There may be more UE devices actively connected to the network than are designated as participating UE devices. Thus, not everyone connected to the network when a disaster hits may actually have a role to play in dealing with it.

This embodiment therefore can reduce the demand on the limited network resource so that it can be more efficiently dedicated to those who are actually aiding in the recovery effort.

A node senses a request by any of the participating UE devices to establish communication with any other of the participating UE devices based on its supplemental characteristic information. The caller therefore need not know the telephone number or name of, for example, a police officer, but may rather simply request that the connection should be put through to some police officer whose UE is currently connected to the network.

An automatic role distribution component then automatically selects from among the set of participating UE devices one participating UE device with which to establish communication. The selection routine may be based on role alone, or also on the geographical positions of the participating UE devices, or on a hierarchy of participating UE devices, or on any combination of these or also other predetermined factors.

DETAILED DESCRIPTION

Figure 1:
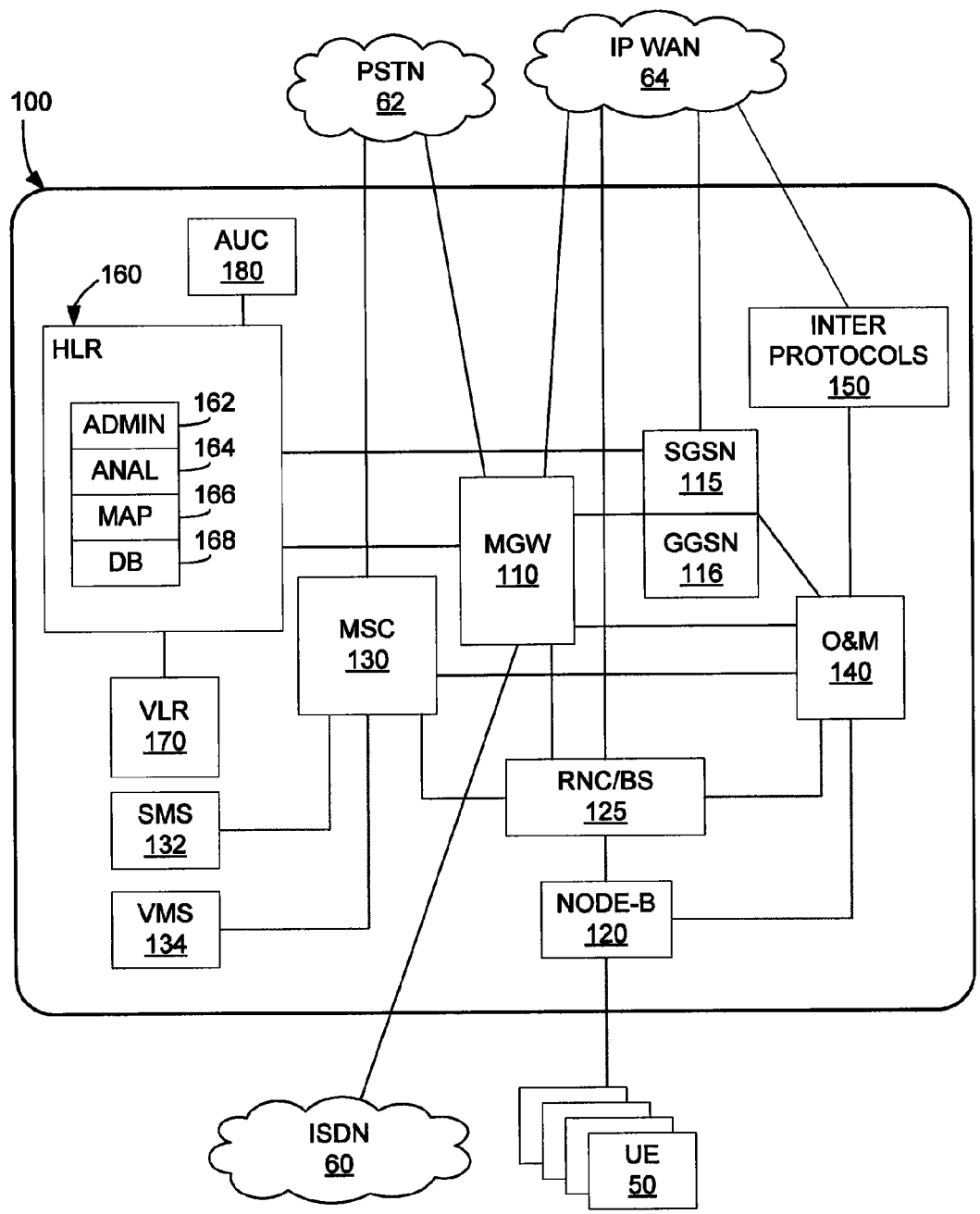
FIG. 1 illustrates some of the main system components of one example of a system architecture suitable for automatically augmenting information stored in a Home Location Register of a mobile telecommunications network and for communicating this supplemental information to active users.

FIG. 1 illustrates some of the main components of system architecture of one example of a typical mobile telecommunications system. The illustrated architecture corresponds at least approximately to an architecture of a transportable, distributed, cellular, wireless, WCDMA (Wideband Code Division Multiple Access), self-contained, autonomous voice network system. This is merely by way of example, however— the principles of the invention do not require this particular system. As those skilled in mobile networking technology will recognize, most of the illustrated components are found in other systems as well, including, but not limited to, GSM systems, GPRS (General Packet Radio Services) systems, UMTS (Universal Mobile Telecommunications System) systems (one of the so-called 3G, that is, third-generation mobile systems), etc. The changes in structure or operation of the components that are added or modified as described below to implement any given aspect of this invention may be applied in such other systems as well, or in any other systems that have analogous components. The invention is described with reference to the architecture and terminology used for FIG. 1 by way of illustration only.

One feature of a communications system that is particularly advantageous in emergency situations is that it will typically not require the complexity of a "normal" system; as is the case with, for example, QuicLink systems currently marketed by Ericsson, Inc., they will generally have a reduced footprint and less capacity compared with, for example, a standard 3G network deployment. One advantage of this reduction, however, is that it may also enable the main system components to be parts of a single communications system 100, which may be made easily transportable to the places where the unit is needed.

The components illustrated in FIG. 1 are well known in the art and not all of them are necessary to implement the invention. They are summarized here, however, for completeness.

User Equipment (UE) 50:
  This is any device via which users interact with the rest of the system, either by voice, with non-voice data, or both. In many implementations of this invention, the UEs 50 will be mobile telephones. A UE 50 may be any device that can communicate wirelessly with the communications system 100, however. The UEs need not be hand-held, but could, for example, be fixed in a vehicle or structure, and of course UEs need not be identical. Below, only one UE is referred to as "the UE 50" merely for the sake of simplicity.

External Networks:
  Although not all types of network access may be needed in actual situations, many spread-spectrum, 3G, mobile telecommunications systems that operate using WCDMA (Wideband Code Division Multiple Access) are capable of accessing different types of networks. Accordingly, FIG. 1 illustrates an ISDN (Integrated Service Digital Network) 60, a Public Service Telephone Network (PSTN) 62, that is, the "normal" or primary telephone network, and an Internet Protocol Wide-Area Network (IP WAN) 64.

Media Gateway (MGW) 110:
  As its name implies, the MGW 110 is an interface component with the various external networks. It also acts as a protocol and data "translator" to allow communication between different ones of the external networks.

Serving GPRS Support Node (SGSN) 115:
  The SGSN delivers data packets from and to the UEs within its geographical service area. Among its several other function are packet routing and transfer. The SGSN also stores certain information such as what cell a given UE is currently in, what the current VLR (see below) is, and user profiles (including IMSI and other network addresses) of users currently active in the region of operation of the communications system.

Gateway GPRS Support Node (GGSN) 116:
  The GGSN 116 is an interface between a GPRS backbone network and external packet data networks such as the IP WAN 64. It converts packets coming from the SGSN into the appropriate packet data protocol and sends them out on the corresponding packet data network. It also converts addresses of incoming data packets to the GSM address of the destination user; the packets are then sent to the SGSN currently handling that user. The GGSN further assigns IP addresses and acts as a default router for the UE 50.

Node-B 120:
  Node-B is a term used to denote what, in some other systems, is called the Base Transceiver Station (BTS), although, unlike in pure GSM base stations, Node-B typically uses WCDMA as its air transport technology. Node-B 120 typically comprises power amplifiers, batteries, one or more antennas and radio frequency transmitters and the receivers, which form the direct contact components with the UEs 50, and so on. Typically, UEs cannot communicate directly with each other, but rather all such communication takes place via a communications system 100, with the Node-B 120 acting as the hardware gateway.

Radio Network Controller/Node B Base Station (RNC/BS) 125:
  The RNC/BS 125 controls the Node-B 120 and manages the physical wireless resources (for example, radio frequency hopping, power control, and handoffs). Depending on the system, the RNC/BS 125 may also be the component that encrypts and decrypts data that passes between the Node-B 120 and the UE 50.

Mobile Switching Center (MSC) Server 130:
  The MSC 130 acts as a form of advanced telephone exchange that provides network switching functions and GSM services to the mobile phones roaming within the area that it serves, such as voice, data and fax services, as well as well as Short Message Service (SMS) 132, that is, text messaging and Voice Messaging Service (VMS) 134.

Operation & Management (O&M) Module 140, Also Known as the Operation and Support System (OSS):
  This component is typically included as an operator-accessible console to allow control and monitoring of the rest of the system.

Figure 2:
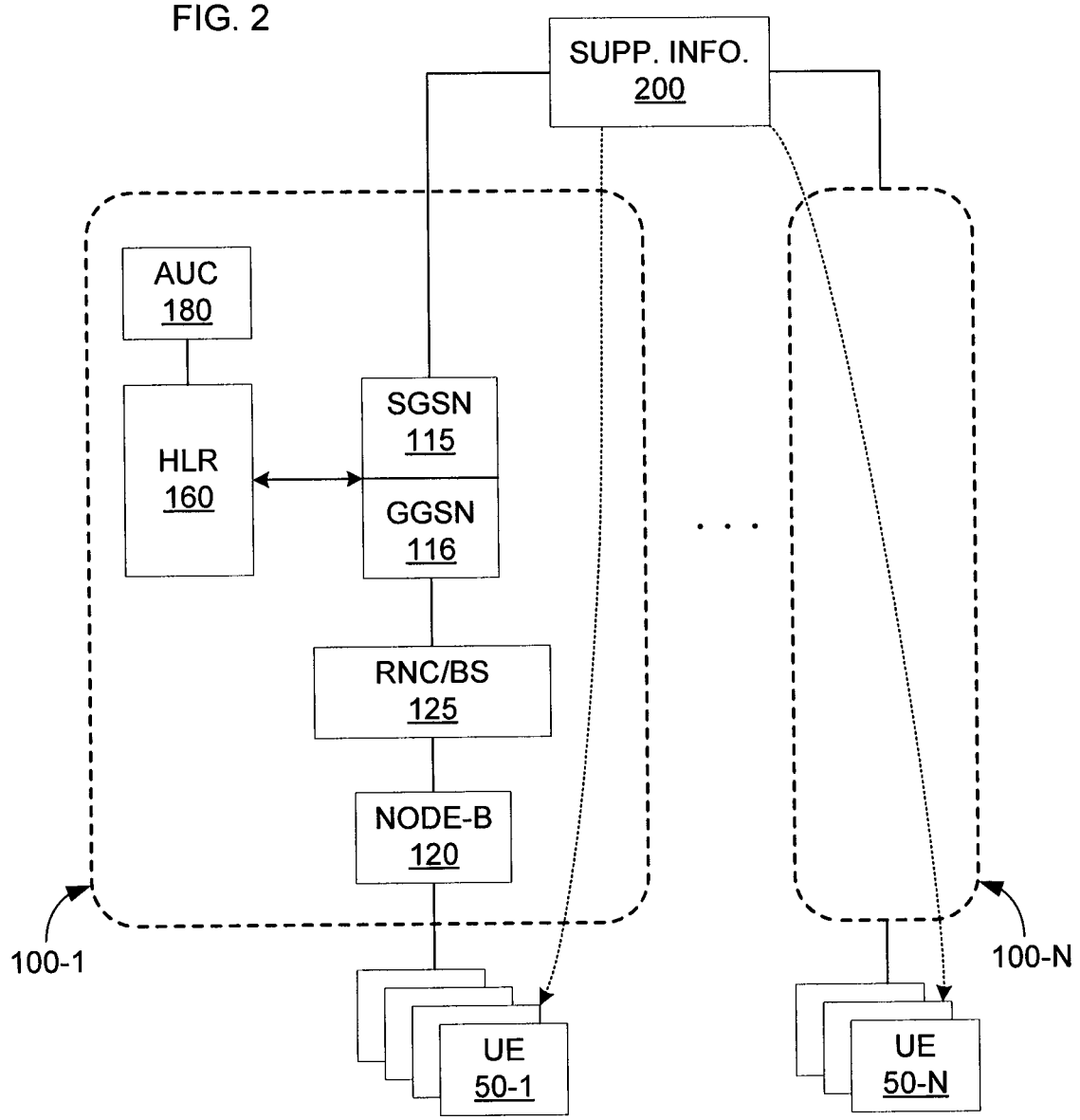
FIG. 2 shows a connected group of communications systems, each configured generally as the system shown in FIG. 1.

Inter-Protocol 150:
  If the communications system 100 is to be coordinated with one or more others in a larger framework, then this component may be used to handle the inter-system communication using any suitably chosen protocol. FIG. 2 illustrates, for example, a group of communications systems 100-1, . . . , 100-N, each with its own associated set (which may be empty) of users UE-1, . . . , UE-N currently actively associated with it.

Home Location Register (HLR) 160:
  The HLR 160 a database system that contains the details of each UE 50 that is authorized to use the core network over which the system operates, such as the GSM core network. The HRL 160 typically stores, for example, the details of every SIM card issued by the mobile telephone phone operator; the HLR records are often indexed using IMSIs as a key. The HLR 160 may also store such information as the current VLR and SGSN addresses and locations of each UE 50 address. The HLR 160 is primarily responsible for managing location updates as UEs roam around. In short, the HLR contains and manages information about the current location of each of its UEs and the services they are authorized to access. When a UE 50 moves from one location area (LA) to another, the HLR 160 retrieves information about what cell the UE is in and sends data identifying that UE to the corresponding VLR and/or SGSN when the UE first roams into the new LA. The HLR 160 also sees to it that UE information is removed from a VLR when the UE roams out of the LA corresponding to that VLR.

Some of the information typically stored in the HLR in the context of mobile telephony includes, for each mobile telephone:

The main Mobile Subscriber ISDN Number (MSISDN) and IMSI of the device. The MSISDN is what most think of as the "phone number" and generally has a format such as [CC, NDC, SN], where CC is the country code (such as 352 for Ireland, 46 for Sweden, etc.), NDC is the National Destination Code (similar to the "area code" in the USA, or a domestic regional code such as 031 for the area of Göteborg in Sweden), and SN is the subscriber's unique.

Permanent Subscriber Data such as a password, a Category, Operator Determined Barring (ODB) data, subscription information, etc.

Supplementary Service Data such as the status of such Supplementary Service, forwarding information, other passwords, etc.

Location Data such as the VLR address (see below), a Mobile Station Roaming Number (MSRN), the number to the home system's MSC 130, the identity of the local MSC, etc.

Visitor Location Register (VLR) 170:

The VLR 170 is a temporary database of the users (UEs) that have roamed into the particular area that it serves. The data stored in the VLR 170 is normally input from either the HLR 160 or the MSC 130. VLR data typically includes such information as the IMSIs and telephone numbers of the UEs 50 and the HLR address of each UE 50; authentication data; the user's MSISDN; indications of which GSM services that the subscriber is allowed to access; the HLR address of the subscriber; etc.

When a mobile station (UE) roams into a new MSC area, the VLR connected to that MSC will typically request data about the mobile station from the HLR. If the mobile station makes a call, the VLR will then have the information needed for establishing the call without having to interrogate the HLR each time. Data stored in the VLR typically includes:

The VLR is usually connected to the MSC of the visited system to pass data, for example, for authentication or call setup, needed by that MSC during its procedures. The VLR is typically also connected to the HLR to request data for mobile phones attached to its serving area, as well as to other VLR's to transfer temporary data concerning the mobile when they roam into new VLR areas.

The primary functions of the VLR include:
notification to the HLR that a subscriber has arrived in the particular area covered by the VLR;
tracking the location of the subscriber is within the VLR area (location area) when no call is ongoing;
allowing and disallowing which services the subscriber may use;
allocation of roaming numbers during the processing of incoming calls;
purging the subscriber record if a subscriber becomes inactive while in the VLR area—the VLR deletes the subscriber's data after a predetermined period of inactivity and notifies the HLR; and
deletion of the subscriber's record when the subscriber moves to another VLR, as instructed by the HLR.

Authentication Center (AUC) 180:

The AUC 180 provides the parameters needed for authentication and encryption functions, which in turn allow verification of the subscriber's identity. In particular, the AUC 180 authenticates the SIM of each UE 50 that tries to connect to the communications system 100. If authentication is successful, the HLR 160 is allowed to manage the SIM and services associated with the newly connected user. An encryption key may also then be generated that is used to encrypt all communications between the UE 50 and, for example, the GSM core network.

Communication between the various components of the communications system 100 shown in FIG. 1 takes places according to protocols that are well known. For example, the communication between HLRs and VLRs often builds on Signaling System No. 7 (SS7), which is a set of telephony signalling protocols used to set up most of the world's PSTN telephone calls. Note that SS7 is sometimes alternatively referred to as "Common Channel Signaling System 7" (CCSS7) or just C7.

As is well known, the "Mobile Application Part" (MAP) is a standard for identifying and authenticating users, and routing calls on mobile phone networks. The MAP standard, found primarily in GSM and WCDMA networks, also defines how users are identified and calls are routed when roaming across different networks. Some analog networks, as well as TDMA and CDMA networks, generally use a different standard, known as ANSI-41.

MAP and ANSI-41 both use SS7 to allow roaming and various other advanced capabilities. Communication between the VLR in a serving system and the HLR of a user's home area is facilitated by these mobile networking protocols and signalling based on SS7. In GSM networks, the MAP rides on top of SS7, allowing VLR-to-HLR (and HLR-to-VLR) communications. In non-GSM networks (such as many of those found in the USA), ANSI-41 is used for HLR/VLR communications.

Although the various components in FIG. 1 are shown separately, corresponding to their functions, they are not necessarily separate physical components within the communications system 100 and the functions they perform as summarized above may be carried out or shared by other components instead. For example, the SSGN 115 and GGSN 116 are usually so closely related that they are shown in FIG. 1 as joined components; in fact, their two functions may in practice be carried out by a single component.

In FIG. 2, an additional network component—a supplemental information system 200—is shown, with which each of the group (which may have any number of members, including only a single member) of communications systems 100-1, . . . , 100-N may communicate using any common protocol. The supplemental information system 200 may be any system that is able to acquire (from the communications systems 100-1, . . . , 100-N directly, and/or by input from an operator using any known means) and store the supplemental information described below, and propagates this information to the communications systems 100-1, . . . , 100-N. In many applications, the supplemental information system 200 will be a network server, which may be dedicated, allowing it be kept small, robust and portable, or part of a server or system that performs other functions as well. To implement this supplemental information feature of one embodiment of the system, the only assumption is that some wireless or wired communications link can be established between the supplemental information system 200 and at least one of the communications systems 100-1, . . . , 100-N.

In FIG. 2, many of the internal components of the communications system 100-1 illustrated in FIG. 1 are left out because they are well known and do not need further explanation for understanding the different aspects of any embodiment. Moreover, no internal components of the communications system 100-N are shown. This is merely for the sake of simplicity. The components of all the communications systems included in a given deployment can be assumed to be present in and the same as or equivalent to those of the communications system 100-1. These will of course include the various computer-related hardware such as processors, bus and network interface devices, power supplies, etc., as well as volatile and non-volatile storage devices such as memory and disks that will store, among other information, the code that the processor(s) execute to carry out both normal operations and the additional procedures according to the invention.

One option that the illustrated embodiment enables is that at least one information element may be introduced, via the supplemental information system 200, into the HLR 160 in addition to those primary information elements currently stored in the HLR by systems according to the prior art, such as the priority class of the user equipment itself. The additional information elements may, for example, be tied to the IMSI and stored as part of the Permanent Subscriber Data normally stored within the HLR. Two examples of such supplemental information include the role of the user of an active UE, and the fact that a particular user has entered or left the group of active users of UEs associated with any of the communications systems 100-1, . . . , 100-N. Recall that this group may be relatively small, with members whose roles may be more relevant to the situations than their phone numbers. Of course, the principles described herein may be applied to more wide-spread, less restricted systems as well.

Assume by way of example that the supplemental information includes the roles, or at least the primary roles, of users of the various UEs 50-1, . . . , 50-N, and also some identifier of the group a UE is associated with. For the sake of succinctness, the term "role" as used in this Description should be understood to mean any relevant characteristic concerning the function or responsibility of a given user, which may include not only job description (fire fighter, police office, paramedic, helicopter pilot, artillery officer, etc.), but also such characteristics as position (local vs. regional, commander or policy maker as opposed to on-the-scene worker, etc.), rank, or the like. The definition of "role" will depend on the circumstances and may be chosen accordingly.

By adding this information into the HLR 150, the system will be able to deploy this information to all of the communications systems 100-1, . . . , 100-N connected to the supplemental information system 200. For example, Subscriber Role could be added in the form of a text string (or numerical code, etc., such as Fire Fighter—1, Police Officer—2, and so on) to the Permanent Subscriber Data, and an integer (or text string, etc.) could be added to indicate a Subscriber Emergency Group. This will allow users to establish communications with each other based on often more relevant information than their phone numbers, such as that one is communicating with a paramedic and not a fire fighter. If the information is communicated using, for example, dynamic WAP/HTNL pages, then receipt could efficiently be accessible only by authorized ones of the UEs.

In self-contained, small-scale WCDMA networks such as QuicLINK, service nodes such as web servers and the like can be connected while running on a standard, even portable computer such as a laptop. Therefore the information stored in the HLR can be distributed in a number of ways. As just one example, the information could be published on a webpage, which may act as the home screen on the UE. As another example, the system could send an SMS message to the UEs.

In some cases, for example when emergency personnel arrive at a scene, it may be easiest simply to give each member of the team a respective dedicated UE (such as a mobile phone) that is already configured with the user's ID, role information, etc., as need and with an updated HLR. As long as the UEs are able to communicate with the central system 100 using the proper protocols, then even non-dedicated UEs could be used as well. Especially in contexts such as where the users are military or similarly non-civilian personnel, service phones could also be adapted so that they would be readily usable with the system according to the invention while still be usable in normal circumstances over a more general network.

Even in the case of dedicated UEs, it might happen that a UE changes users. For example, a police officer may give his mobile phone to a fire fighter. As user information is stored in the HLR, a simple update of the HLR record for the phone would suffice to reflect this change. Then, for example, the new user could send an SMS message to the system 100 in the normal manner, which could trigger an automatic update of the role information in the HLR.

More or different supplemental data may of course be added to the HLR using the same mechanism. Moreover, in some contexts, less information may be needed. For example, in some contexts, only a given UE user's role may be of interest, whereas other systems or situations may benefit from having the greater level of granularity of having group information provided as well. For example, in some situations just knowing that a user is a fire fighter may suffice, but in a large-scale disaster it may be much more helpful to also know that the fire fighter is in the group in Sector Northwest.

There are different ways to trigger the provision of the supplemental information to the various communications systems 100-1, . . . , 100-N, and thus enter in into the respective HLRs 160. One way is through direct operator intervention, for example at a Network Operations Center (NOC)—the NOC tells the relevant part of the system, in particular, the communications systems 100-1, . . . , 100-N, that there is a state of emergency and that Priority access and deployment of emergency numbers should commence. NOC intervention may be by any known means, such as entering appropriate commands and information into a terminal that is associated with the supplemental information system 200 or some other system accessible to the whole network. All prioritized UEs then receive the relevant information.

Another way to trigger supplemental information retrieval is automatic—when an allowed UE connects to any one of the communications systems 100-1, . . . , 100-N, the relevant information about the newly connected user is automatically provided to all other connected UEs, and information about the other UEs is automatically provided to the newly connected UE.

Note that this latter automatic triggering option also indicates another type of supplemental information that the system can provide, namely, contact details for newly connected users, as well as information about currently connected users to a newly connected UE. Each UE will therefore be able to have a list of all existing active users in a given group (for example), as well as their contact information. Whenever a user leaves the group, that is, disconnects from the network, his information may be removed from the corresponding HLR and the supplemental information may be similarly updated in all the remaining users' UEs. Users would therefore conveniently and automatically be notified, for example, that emergency medical personnel have arrived on a scene, or are at least in the network and may be contacted on their UEs.

Figure 3:
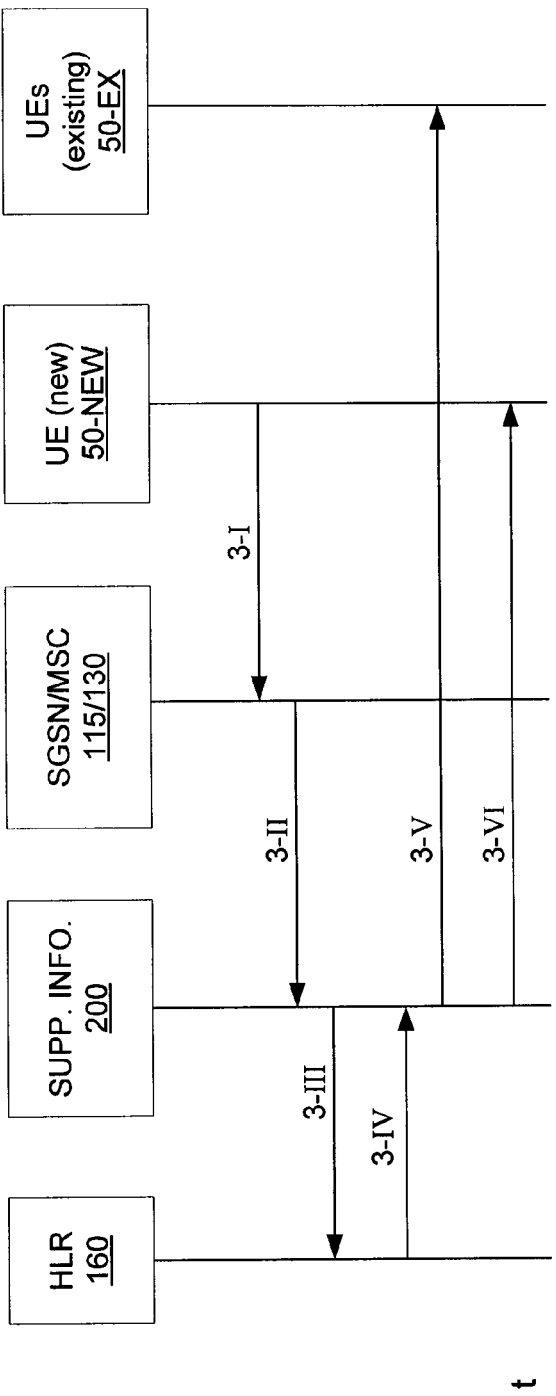
FIG. 3 illustrates information and message flow between various system components when a new user enters the network shown by way of example in FIGS. 1 and 2.

FIG. 3 is a time-lined (time t) flow chart. Assume by way of example a scenario in which an earthquake hits a large city and disables communications. A system incorporating the structures and principles discussed above may then be deployed to the city to provide emergency communications. Emergency personnel arrive in the area and are issued mobile phones or other user equipment that can communicate over the same network. Each UE is assigned a specific role; as mentioned above, this may be by suitable encoding of its IMSI and/or MSISDN. The HLR will then contain role and group information associated with the UEs in addition to the conventional information stored in the HLR.

Assume further that one or more UEs (50-EX) are already registered and active on the network and that a new UE (50-NEW) connects. FIG. 3 illustrates the following sequence of events:

3-I: The new user (UE) 50-NEW connects to the network in the normal fashion. This is noted by the SSGN and MSC as in conventional systems.

3-II: The SSGN/MSC communicates to the supplemental information system 200 that a new user has entered the network, for example by relaying the new user's IMSI.

3-III: The supplemental information system 200 sends a request to the HLR 160 to retrieve the supplemental information about the newly entered user, for example by submitting the IMSI.

3-IV: The HLR 160 returns the requested information to the supplemental information system supplemental information system 200.

3-V: The supplemental information system 200 sends an update to all the already active, existing users 50-EX about the new user. This information may, as indicated above, be simply information identifying the new user, or may also include role and group, etc., information. Contact lists of each UE are then automatically updated with the new user and his role.

3-VI: The supplemental information system 200 then (or at the same time as 3-V) sends the list of active users and their roles to the new user 50-NEW.

If a searcher then for example finds a trapped body, he can open the contact list in his UE, which will list all currently active users, which may also be based on their roles in the ongoing activity.

As an alternative, if a standard UTMS system is being used, then users may enter the scene not with phones provided and provisioned by an issuing authority, but with their "own" phones, which can be accessed and updated using known protocols.

When a user leaves the network, the same basic procedures are followed as illustrated in FIG. 3, but instead of adding information and communicating information about the new user to other users, the corresponding information is deleted and other users' contact lists are updated with the exited user deleted. Of course, there will be no need to communicate supplemental information to the exiting user's UE at all, although as part of a sign-off protocol the exiting UE's contact list could be deleted if desired or otherwise marked as being out-dated.

Figure 4:
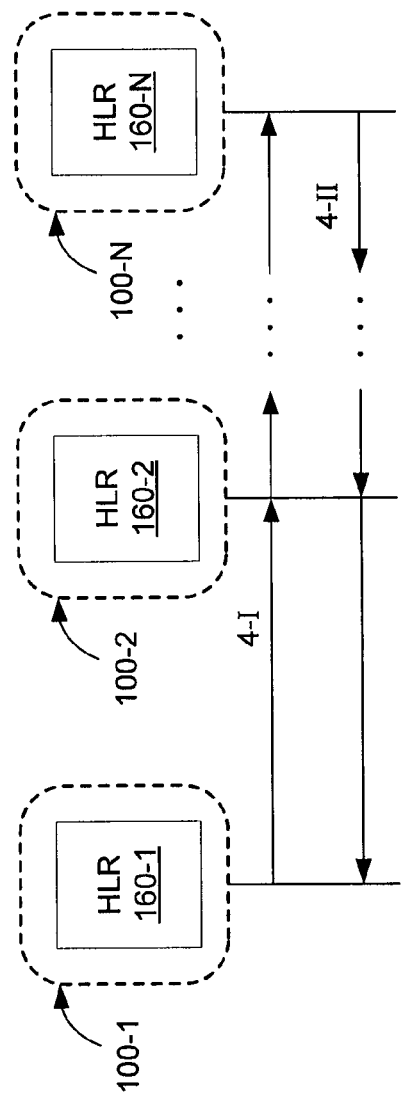
FIG. 4 illustrates user data exchange between various members of a networked community of communications systems configured at least generally as the system illustrated in FIGS. 1 and 2.

As mentioned above, the supplemental information system 200 may serve any number of communications systems 100-1, communications systems 100-1, ..., 100-2, ..., 100-N, including only one. In implementations with more than communications system, however, if these are linked by a network and communicate using any chosen protocol, then the HLRs can be synchronized such that all users in all systems will be able to access the same contact data. FIG. 4 illustrates this possibility, in which a change in contact information stored in the HLR 160-1 of a communications system 100-1 is transmitted (arrow 4-I) to the HLRs 160-2, ..., 160-N of other communications systems 100-2, ..., 100-N in the networked community. As arrow 4-II indicates, changes to the HLR of any of the member systems, such as to HLR 160-N of communications system 100-N, can similarly be automatically propagated to the other systems.

As skilled telecommunications engineers will realize, the mechanisms for updating HLRs, for communicating information between internal system components, and between communications systems 100-1, ..., 100-N and UEs and each other, may generally be implemented using existing hardware. Implementing the various aspects of the invention, however, will generally entail changes and additions to the programming code that controls and directs the interaction between the SSGN/GGSN 115, 166 and the HLRs 160. The supplemental information system 200 will in many cases involve a separate hardware unit, but may also be implemented as a programming change in an existing system such as a server, as long as provision is made to receive and store the information to be communicated among UEs.

The feature of adding at least one additional field to the HLR may be extended to the VLRs as well. By modifying the MAP protocol suitably, new data fields may also be transferred between an HLR and a VLR.

On-Request Subscriber Role Announcement

In the embodiments discussed above, complete subscriber role information is transferred between a HLR and the corresponding VLR, that is, the VLR controlling the location area the subscriber is located in at a given moment. This approach results in transfer of a significant amount of data because emergency profiles are transferred whenever a subscriber roams outside of its home network. Since the emergency profile data is used only in emergency situation, however, the transferred data will not always be used and hence network resources may not be utilized optimally.

According to another embodiment, the MAP protocol is augmented to allow distribution of the subscriber role information on a VLR request. In particular, when a network that a subscriber is visiting at a given moment is switched to an emergency mode, the HLR initiates appropriate emergency procedures. Switching the system into the emergency mode may be accomplished, for example, by management action from an OSS like application such as the O&M module 140 setting an appropriate flag 162 in the network's HLR. This setting of a flag may be done using the procedures described above.

When the current HLR 160 is set in the emergency mode, it will also trigger an emergency procedure in the VLR 170. The VLR will in turn send requests to all HLRs whose mobile phones are currently registered in the VLR requesting information about the role their subscribers have in such situations. This information request may be limited to only those mobile phones that in their profile have an indication (such as a flag) about the availability of the additional role description, that is, a Subscriber Role Availability (SRA) indicator. For example, fire fighters' mobile phones may be configured with a role description, whereas those of civilians with no designated responsibility in emergencies may not be. After obtaining this information, the network that is in the emergency state will deploy this information and thus allow easier establishment of communication links between relevant persons based on their role in the current activity, not just on the name or phone number of the users.

Figure 5:
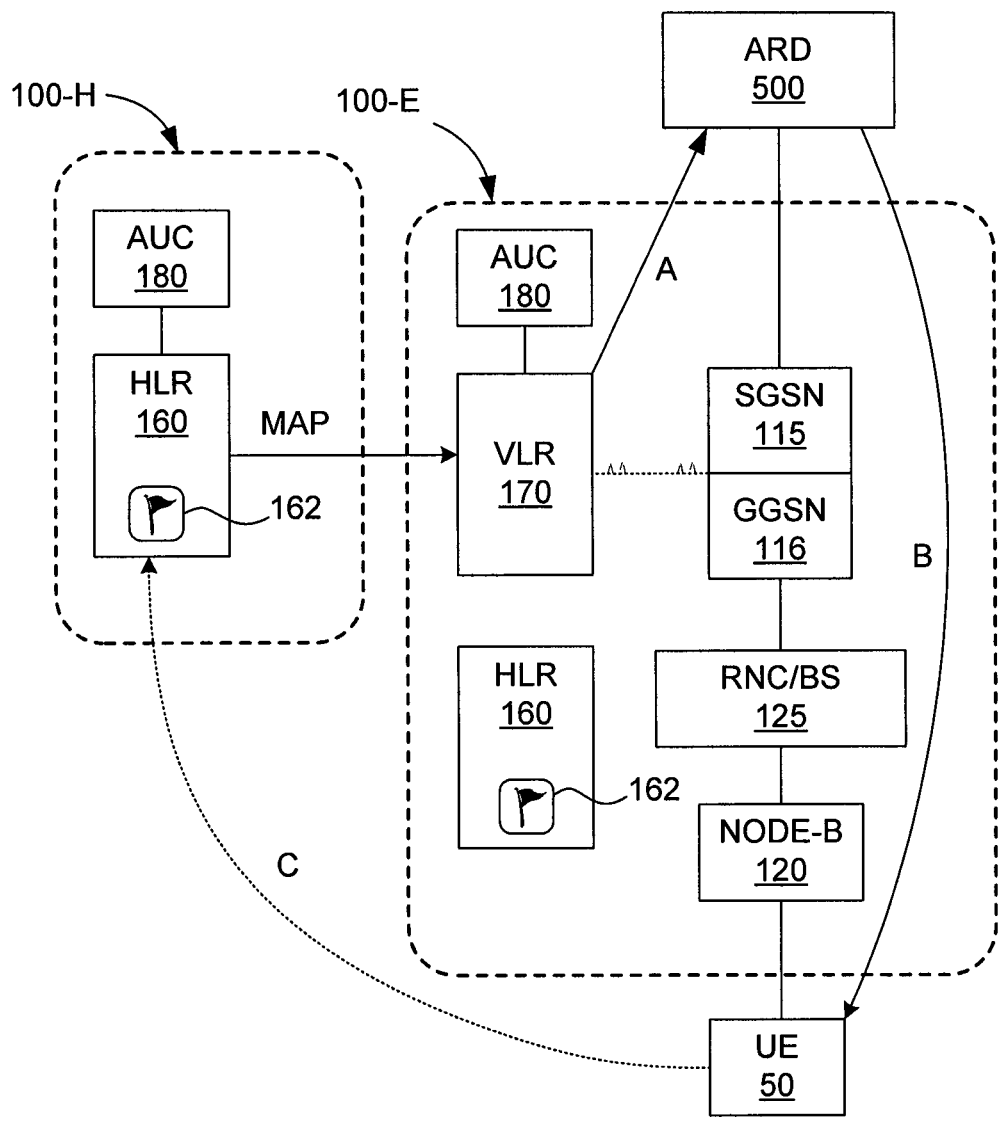
FIG. 5 illustrates some of the main components of one example of a system architecture suitable for implementing automatic on-demand distribution of subscriber role information.

FIG. 5 is a simplified architecture of a mobile telecommunications system with addition of updated network elements used to implement this on-demand subscriber role announcement feature. In FIG. 5, 100-H designates the home system of a particular subscriber (that is, of his user equipment 50) and 100-E designates the system or "zone" in which the user current finds himself and that has been set into the emergency mode.

An additional, auxiliary, Automatic Role Distribution (ARD) module 500 is included, with communications established as for the supplemental information module 200 shown in FIG. 2; indeed, depending on the chosen design, the two modules could be combined. This ARD module 500 may be external to the system 100-E, for example, implemented within a supervisory network server One way to facilitate on-request distribution of the roles individual subscribers have is to update the MAP protocol from the HLR to include the subscriber role availability flag 162. This flag will be set to 1 (for example) for all mobile subscribers with a specific role description stored in HLR. For other mobile subscribers, this flag will be set to 0; for these subscribers, all network procedures will function unchanged and will simply not take part in the on-demand role announcement procedures.

As mentioned above, the procedure for distribution of subscriber roles may be triggered by a management action that puts the network into an emergency state. When this procedure is invoked, an Emergency state flag in the HLR is raised (for example, set to 1); in the non-emergency state, this flag will be lowered, for example, set to 0.

Augmented with the emergency state flag the structure of the HLR will include (in addition to other conventional information):
- Main ISDN, IMSI
- Additional MSISDNs, in particular in situations where the PSTN lacks bearer capabilities
- Permanent Subscriber Data such as Password, Category, Operator-Determined Bar (ODB), subscription information, indications of an provision of Supplementary Services (SS), Subscriber Role (for example, an alphanumeric or symbolic string), Subscriber Emergency Group (for example, an integer)
- Supplementary Service Data, such as status of SS, forwarded-to number, password, barred information
- Location Data such as VLR address, MSRN, MSC number, Local MS Identity
- Emergency state flag (set for example to 0 when in normal state, set to 1 when in the emergency state)

When in the Emergency state, the flag 162 is set to 1. The HLR 160 in the emergency zone system 100-E may then initiate the relevant emergency procedure and will request from the VLR 170 to gather the role information of current visiting subscribers. Recall the example above that the data <Subscriber Role; Group> might be <Fire Fighter; 1>, <Police Officer; 2>, and so on.

The VLR 170 will first identify all visiting mobile subscribers whose emergency availability flag is set to 1. Then, requests will be sent to HLRs of the identified mobile subscribers. From this point onwards, the procedure described above may apply, that is, the HLRs may send the subscribers' role description information to the VLR in appropriate information elements of the augmented MAP protocol.

Figure 6:
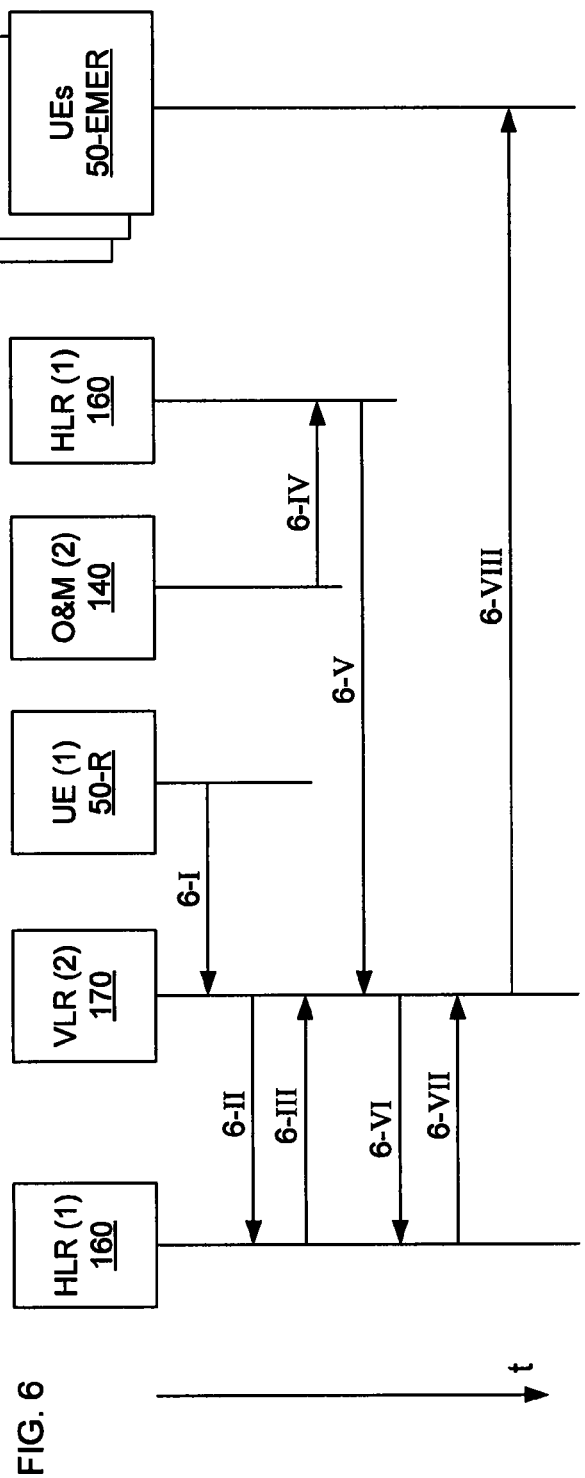
FIG. 6 illustrates information and message flow between various system components for automatic on-demand distribution of subscriber role information.

In the Normal state, the VLR data are updated to include:
- Main ISDN, IMSI
- Additional MSISDNs, in particular in situations where the PSTN lacks bearer capabilities
- Permanent Subscriber Data such as Password, Category, ODB, subscription information, indications of an provision of Supplementary Services (SS), and Subscriber Role Availability Flag (which need be only one bit)
- Supplementary Service Data, such as status of SS, forwarded-to number, password, and barred information
- Location Data such as HLR address, MSRN, MSC number, and Remote MS Identity In the Emergency state, the VLR data are updated to include:
- Main ISDN, IMSI
- Additional MSISDNs, as above
- Permanent Subscriber Data such as Password, Category, ODB, subscription information, indications of an provision of Supplementary Services (SS), and Subscriber Role (for example, an alphanumeric or symbolic string), Subscriber Emergency Group (for example, an integer)
- Supplementary Service Data, such as status of SS, forwarded-to number, password, and barred information
- Location Data such as HLR address, MSRN, MSC number, and Remote MS Identity FIG. 6 illustrates one example of a sequence messages between systems when one emergency UE 50-R, whose home network components are indicated by "(1)", roams to another network, whose components are indicated by "(2)":

6-I: Attach to network (2)
6-II: UE information request (MAP) (Note that the HLR contains the Subscriber Role and Subscriber Emergency Group information elements, as explained above.)
6-III: UE Information (MAP) Subscriber Role Availability Flag included
6-IV: Set Emergency flag to 1
6-V: VLR identifies subscribers with Emergency flag set to 1
6-VI: UE Role Information Request (MAP)
6-VII: UE Information (MAP) Subscriber Role information included
6-VIII: Active users informed about the available roles (whereupon the emergency contact lists may be updated)

By way of example, assume that an earthquake or similar disaster has occurred. The following is one example of a flow of events and messages:

1) A mobile subscriber with a role description available in its HLR roams to another network. (UE information including subscriber and role flag information will already have been passed to the UE's associated HLR, as indicated by Path C in FIG. 5.)
2) The HLR informs the VLR that the subscriber has a role description included in the profile by setting the SRA flag to 1.
3) An earthquake hits a major city and disables communications.
4) The telecommunications system is put into emergency state through an OSS procedure.
5) The VLR identifies all mobile subscribers with the SRA flag set to 1.
6) The VLR sends UE role description request messages to HLRs that identified UEs belong to.
7) The HLRs respond with UE role subscription messages.
8) The VLR is updated to contain the role and group information associated with the mobile devices in addition to the information in use currently.
9) The core (supervisory) network informs Automatic Role Distribution component 500 whenever a new user attaches to the network.
10) The Automatic Role Distribution component 500 retrieves Subscriber Role data and Subscriber Emergency Group information from HLR and VLR (Path A in FIG. 5).
11) The Automatic Role Distribution component 500 sends an update to all already active emergency users about the new users performing a role in the ongoing activity as they join the network. Contact lists of each emergency user are automatically updated with the new users and their roles (for example, Fire Fighter 1, Police Officer 2, HQ 3, etc.).

12) The Automatic Role Distribution component 500 sends the complete list of active users and their roles to the new user (Path B in FIG. 5).

13) A searcher finds trapped bodies and needs to contact relevant personnel.

14) Using his mobile phone, he opens up the contact list, which lists all currently active emergency users based on their roles in the ongoing activity. The searcher can thus directly select, for example, someone whose role is "Rescue," without having to know any particular rescuer's name or phone number.

15) Contact is initiated and the rescue activities proceed.

Note that, using this aspect of the disclosed system, with inclusion of a new information field in the HLR that allows automatic initiation of emergency procedures, distribution of the role description may be made on-demand, which reduces the amount of data that needs to be transferred across the network at the very time when efficient use of network bandwidth is most critical, namely, in an emergency.

Principles of this invention may be applied to provide other modifications that provide additional levels of automation, ease of use, and flexibility. Two such modifications relate to the provision of short codes and to the incorporation of position information.

Most users of modern mobile phones are familiar with short codes (sometimes referred to as short numbers), which are a form of "abbreviated" telephone numbers. For example, the dialed sequence "112" is the number for emergency services adopted in the European Union, whereas other countries have different numbers for different services. For example, in China, "110" is for Police, "119" is for Fire, "120" is for Medical, and "122" is specifically for traffic accidents. In addition to "112", Switzerland has designated, among others, "145" for poisonings and "143" for free and anonymous psychological support. In South Korea, one need dial only "113" to report spies, and in Greece one can quickly report a forest fire by dialing "191". Not all short numbers involve emergencies. For example, so-called Common Short Codes (CSCs) in the United States involve strings of five- or six-digit numbers to which text messages can be addressed, allowing wireless subscribers to access applications on all participating wireless carriers' networks. Applications range from entertainment-related to voting and participating in games.

Common to all these schemes, however, is that the subscriber need only dial some abbreviated numeric or alphanumeric sequence to access another subscriber or center, without having to know a complete standard telephone number or, in many cases, even the name of the subscriber being contacted.

According to this embodiment, the system is augmented such that a subscriber may dial a short code of a desired subscriber group in order to reach someone having the corresponding role. For example, when the system is switched into the Emergency state, subscribers whose phones are configured to participate in role distribution need dial only some easily remembered short code to reach some police officer or some fire fighter, etc. To this end, if this embodiment is implemented and activated (in any desired manner, including such that the subscriber may selectively use short code dialing), the subscriber's mobile phone need display only the roles reported by the ARD component 500—the subscriber will usually not care which police officer arrives, but rather mostly that one should arrive soon.

The ARD component 500 preferably includes some routine (that is, body of computer-executable code running from some installed medium) that selects which target subscriber to choose when a given dialing subscriber requests connection with someone in a particular role group. One advantageous choice is based on geographical proximity. To implement such a choice, however, the system must have access to the geographical positions of the subscribers involved.

U.S. patent application Ser. No. 11/145,158, "Method of and system for reducing a time to fix in a location-enabled receiver," (Inventor: Graham Wells, Assignee: Telefonaktiebolaget L M Ericsson), filed 3 Jun. 2005 and published 9 Mar. 2006 as United Stated Published Patent Application No. 2006/0049982 discloses features of a Mobile Location Center (MLC) that obtains Global Positioning System (GPS) data and translates them into a format required by a GSM mobile station. According to the disclosed system, a GPS receiver communicates directly with the MLC, which also accesses a database containing the coordinates of all cell sites that are in the geographic area served by the MLC. In short, the disclosed system is able to determine the position of an active subscriber's UE at least to within an approximate radius of the range of the cell the subscriber is in.

U.S. patent application Ser. No. 11/130,485, "Method and apparatus for selecting a location platform for a user equipment to roam and method for determining a location of a user equipment using the same", (Inventor: Wuk Kim, et al., Assignee: Samsung Electronics Co., Ltd.), filed 17 May 2005 and published 17 Nov. 2005 as United Stated Published Patent Application No. 2005/0255857 discloses a mobile location service (MLS) system for determining the location of a UE in a mobile communication network. Positional information for a roaming UE is proposed to be obtained in any of several ways, including: 1) using information of the cell nearest to the location of the UE or of the cell managing the UE; 2) network-based positioning using triangulation based on a function of signal intensity and propagation calculations such as Node B-to-UE time-of-arrival or time-difference-of-arrival; and 3) GPS data, in particular, network assisted GPS (NA-GPS).

Figure 7:
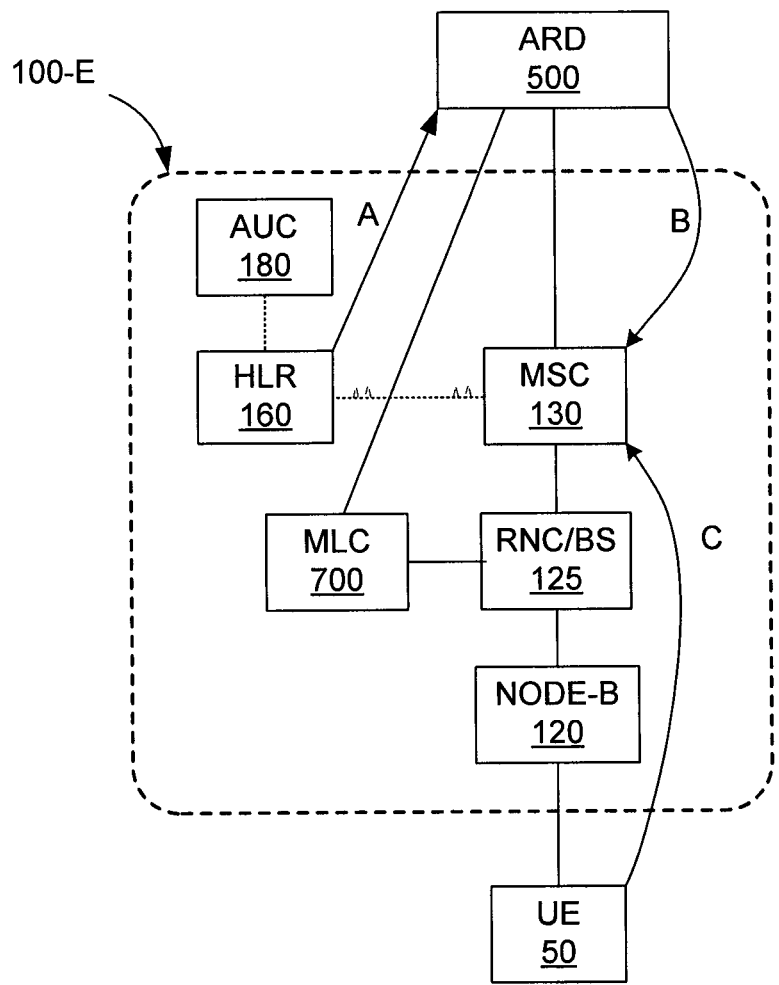
FIG. 7 illustrates some of the main components of one example of system architecture suitable for enabling role-targeted dialing based on short codes, in particular where the dialed subscriber is selected in part based on geographical location.

FIG. 7 illustrates a simplified architecture of a mobile telecommunications system that incorporates positional information using a mobile location center MLC 700, which interacts with any chosen mobile location service (MLS). Of course, the other components shown in the earlier figures may be assumed to be present.

It would also be possible, and indeed has already been proposed, to incorporate GPS (or other position-determining system, such as the Soviet/Russian Global Navigation Satellite System GLONASS) circuitry directly into GSM phones and in fact GPS-enabled GSM phones already exist. As such, the current RNC or MSC can establish the location of a subscriber to within GPS accuracy. In these cases, the MLC could obtain and pass on more accurate positional data for active subscribers. Both possibilities could also be incorporated, such that the MLC uses GPS data if available for a given active subscriber or the less precise cell position if not.

By way of example, assume some emergency has occurred. Using an embodiment with both short codes and positional information, one possible sequence of events and messages might be as follows:

1) An emergency is declared and the telecommunications system is put into the Emergency state, as described above.

2) Rescue workers enter the area and power up their mobile telephones. Each mobile will already have assigned a specific role (fire fighter, police officer, etc.) in their home network, that is, additional HLR information as described above.

3) The VLR is updated to contain the role and group information associated with the mobile devices.

4) The core network informs the ARD component 500 whenever a new user attaches to the network.

5) The ARD component 500 retrieves Subscriber Role and Subscriber Emergency Group information from the HLR 160 and VLR 170 (path A in FIG. 7).

6) The ARD component 500 sends an update to all already active emergency users about the new users performing a role in the ongoing activity as they join the network. Contact lists of each emergency user are automatically updated with the new users and their roles (for example, Fire Fighter 1, Police Officer 2, HQ 3, etc.).

7) The ARD component 500 sends the complete list of active users and their roles to the new user.

8) A worker requires specialized support from another emergency worker.

9) Using his mobile phone he dials a short code (path C in FIG. 7) for the relevant group of the required emergency personnel active in the emergency. As mentioned above, the mobile phone may be configured to display only the roles reported by the ARD component 500.

10) Using the networks' Mobile Location Services to retrieve location information for the requested role, the ARD component 500 selects the most appropriate subscriber and sends the relevant number to the Core network (path B in FIG. 7).

11) The core network establishes the call and the job continues.

Figure 8:
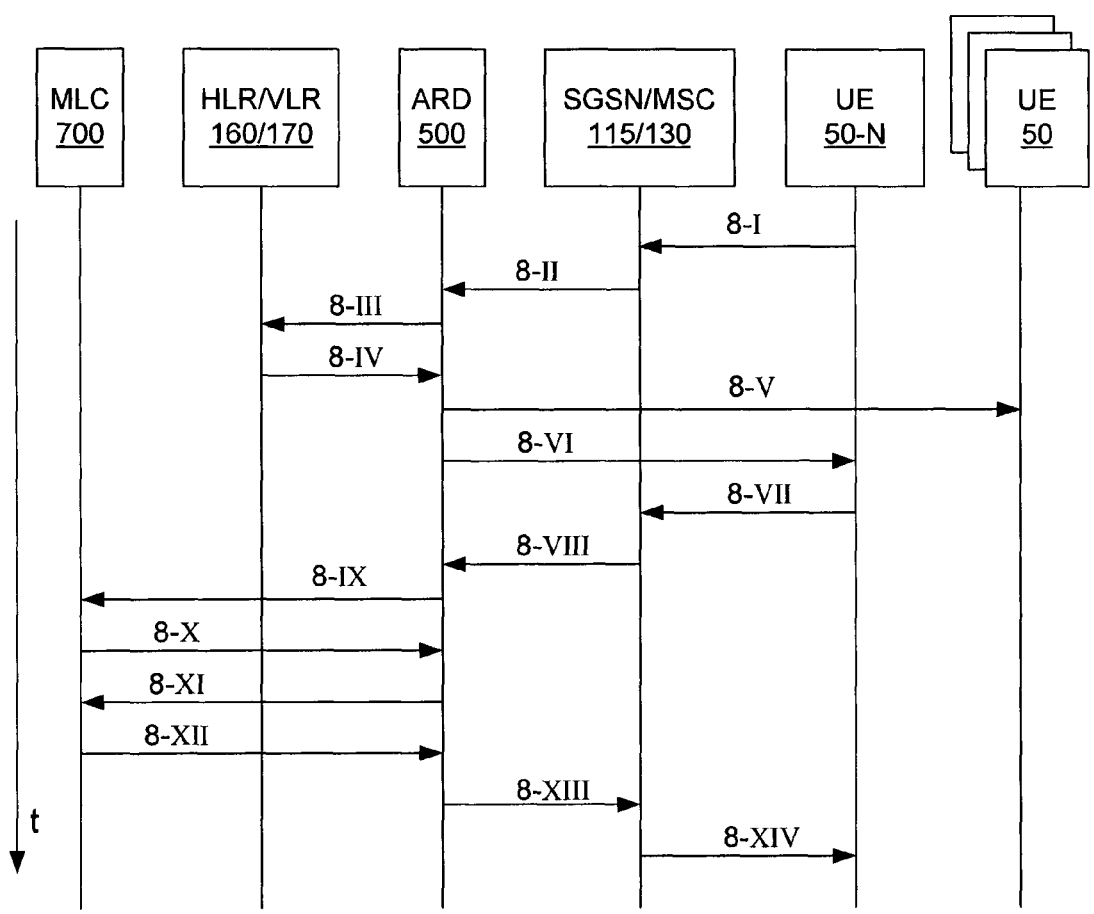
FIG. 8 illustrates information and message flow between various system components used in one embodiment of the system illustrated in FIG. 7.

FIG. 8 outlines the message flow in this scenario:

8-I: New user 50-N attaches to the network

8-II: New user available (IMSI)

8-III: Role information request (IMSI)

8-IV: Role information response (Subscriber Role, Emergency Group)

8-V: Already active users informed about the new role available; emergency contact lists are updated 8-VI: Newly attached user's UE given information about already active users 8-VII: Shortcode 8-VIII: Where is the nearest group member (group)?

8-IX: Where is the intended subscriber (X) to be called, that is, where is X's corresponding IMSI? The ARD 500 will preferably have knowledge of the roles and IMSIs of all subscribers, or at least of some selected sub-set. The ARD can thus identify which subscribers with a particular role are currently active and may ask for the location of each member of a requested role group separately or can do so in one go by sending a list of group members. The ARD can determine which IMSI is closest to a caller by querying the MLC.

8-X: Location of X

8-XI: Where is the group (IMSI list)?

8-XII: Location of Group Members (GPS coordinate list)

8-XIII: Nearest relevant worker

8-XIV: Call

One issue that might arise is that there is no currently active subscriber whose role is the one requested by a calling subscriber. For example, there may simply be no designated police officer currently active in the network. Depending on the embodiment, this issue may resolve itself: Since role information is transmitted to UEs, if nobody has a particular role then no option for dialing anyone with that role will be presented in the UEs. Alternatively, if a user, for example, enters a short code for a police officer, and none is available, then the system could generate any chosen signal to indicate this, such as a display of text such as "Not available."

The ARD component 500 may be configured to select which subscriber to connect to based on other factors besides, or in addition to, location, and this opens up other possibilities for handling this situation. For example, it would also be possible to expand the information about a subscriber's role to include the notion of a hierarchy or "fall-back" selection. Thus, "role" could be interpreted to mean or include concepts of responsibility such as "individual worker", "first-level leader", "second-level leader", . . . , "highest-level, general leader".

For example, if "2" generally indicates "police officer", then "21", "22", and "23" might be used to indicate a police officer at level 1, 2, and 3 where, for example, 1 is the level with the greatest authority and 3 is the lowest. "Role" could thus include a notion of responsibility level as well. The ARD component 500 could then select an appropriate subscriber restricted to a default responsibility level, and if none is available, then it could attempt to select one and the next highest responsibility level, etc. For example, if no street-level police officer is available, then the call could be routed to a sergeant, and if no sergeants are available, then upward in the chain of command to a lieutenant, etc.

If nobody is currently active with a desired role, then the selection routine in the ARD component 500 could select somebody in a designated fall-back role instead. For example, if no medic is currently available, then the ADR component 500 could connect the calling subscriber with the closest fire fighter, etc. Thus, the ARD component 500 could be configured to select called subscribers in accordance with a form of linked list, such that if no elements (subscribers) are active on a given list (role, or role at a certain responsibility level), then it is pointed to some entry point of a different list (some other role). As needed, additional information describing hierarchical information and fallback information may also be included in the HLR and VLR.

The invention claimed is:

1. A network element comprising a Visitor Location Register (VLR) within a wireless, cellular voice network of at least one communications system configured according to any of the Global System for Mobile Communications (GSM), the General Packet Radio Services (GPRS), the 3G or the Universal Mobile Telecommunications System (UMTS) standards, in which the VLR stores information about each of a plurality of user equipment (UE) devices, that are roamed into the wireless, cellular voice network and that are currently active within a service area of the VLR;

wherein:

the VLR is configured to receive from a Home Location Register a flag associated with a UE and indicating that a user using the UE has at least one pre-assigned role;

the VLR is configured to identify users in the service area of the VLR that have at least one pre-assigned role based on flags received from the Home Location Register and to obtain from the Home Location Register and store within the VLR entries describing pre-assigned roles of the identified users actively connected to one of the communications systems; and the VLR is configured to receive and process requests by any of the UEs active within a service area of the VLR for connection to any other UE on the basis of the at least one pre-assigned role of the user associated with the other UE.

2. The network element according to claim 1, wherein the VLR is configured to retrieve the at least one entry for each UE from a Home Location Register (HLR) with which each UE is respectively associated.

3. A network element comprising a Home Location Register (HLR) within a wireless, cellular voice network of at least one communications system configured according to any of the Global System for Mobile Communications (GSM), the General Packet Radio Services (GPRS), the 3G or the Universal Mobile Telecommunications System (UMTS) standards,
- in which the HLR is configured to store information about each of a plurality of user equipment (UE) devices that are associated with the HLR;
- the HLR is configured to store not only primary information of each of the HLR-associated UEs but also at least one entry indicating at least one pre-assigned role of a respective user of each of the HLR-associated UEs;
- the HLR is configured to send to a Visitor Location Register (VLR) a flag associated with a UE and indicating that a user of the UE has at least one pre-assigned role; and
- the HLR is configured to provide at a request from the VLR at least one entry describing at least one pre-assigned role of the user of the UE associated with the flag.

4. The network element according to claim 3, wherein the HLR is configured to receive and respond to a request from a Visitor Location Register for both the primary information for a UE currently active within a service area of the VLR and also the role assigned to the user of that UE.

* * * * *